United States Patent
Kim et al.

(10) Patent No.: US 10,294,320 B2
(45) Date of Patent: May 21, 2019

(54) LATEX COMPRISING WATER-SOLUBLE ACRYLIC MODIFIED ALKYD DISPERSION AND METHOD OF PRODUCTION THEREOF

(71) Applicant: Arkema Inc., King of Prussia, PA (US)

(72) Inventors: Kyu-Jun Kim, Cary, NC (US); Daniel E. Stark, Raleigh, NC (US); Jeffrey P. Arendt, Cary, NC (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 15/523,432

(22) PCT Filed: Oct. 29, 2015

(86) PCT No.: PCT/US2015/057929
§ 371 (c)(1),
(2) Date: May 1, 2017

(87) PCT Pub. No.: WO2016/073260
PCT Pub. Date: May 12, 2016

(65) Prior Publication Data
US 2017/0313803 A1    Nov. 2, 2017

Related U.S. Application Data

(60) Provisional application No. 62/074,117, filed on Nov. 3, 2014.

(51) Int. Cl.
| | |
|---|---|
| C08F 283/01 | (2006.01) |
| C09D 167/00 | (2006.01) |
| C08F 2/24 | (2006.01) |
| C09D 167/06 | (2006.01) |
| C09D 167/08 | (2006.01) |

(52) U.S. Cl.
CPC ............ *C08F 283/01* (2013.01); *C08F 2/24* (2013.01); *C09D 167/00* (2013.01); *C09D 167/06* (2013.01); *C09D 167/08* (2013.01)

(58) Field of Classification Search
CPC ............................ C08F 283/01; C09D 167/08
USPC ............................................................ 524/599
See application file for complete search history.

(56) References Cited

U.S. PATENT DOCUMENTS

| | | | |
|---|---|---|---|
| 4,116,903 A | 9/1978 | Lietz et al. | |
| 4,624,973 A | 11/1986 | Kuwajima et al. | |
| 5,306,793 A | 4/1994 | Parker, III et al. | |
| 6,001,922 A * | 12/1999 | Clark | C08F 257/02 524/457 |
| 6,242,528 B1 | 6/2001 | Clark et al. | |
| 6,262,149 B1 | 7/2001 | Clark et al. | |
| 6,333,378 B1 * | 12/2001 | Clark | C08F 273/00 524/560 |
| 6,369,135 B1 | 4/2002 | Schork et al. | |
| 6,599,972 B2 | 7/2003 | Thames et al. | |
| 6,624,223 B1 | 9/2003 | Thames et al. | |
| 6,924,333 B2 | 8/2005 | Bloom et al. | |
| 7,906,571 B2 | 3/2011 | Bloom et al. | |
| 2009/0258971 A1 | 10/2009 | Heiskanen et al. | |
| 2010/0016551 A1 | 1/2010 | Williams | |
| 2011/0144258 A1 * | 6/2011 | Roller | C09D 133/08 524/457 |

FOREIGN PATENT DOCUMENTS

| | | |
|---|---|---|
| EP | 0 267 562 B1 | 11/1987 |
| EP | 1 726 604 A1 | 11/2006 |
| IN | 2014MU01252 A * | 12/2015 |
| WO | WO 02/10297 A2 | 2/2002 |
| WO | WO 2007/101908 A1 | 9/2007 |
| WO | WO 2008/152078 A1 | 12/2008 |
| WO | WO 2010/040844 A1 | 4/2010 |
| WO | WO 2011/082965 A2 | 7/2011 |
| WO | WO 2011/121085 A1 | 10/2011 |

* cited by examiner

*Primary Examiner* — Michael Bernshteyn
(74) *Attorney, Agent, or Firm* — Lynn B. Morreale

(57) ABSTRACT

A latex particle comprises an interior core and an outer shell. The core comprises an acrylic or vinyl polymer, and the shell comprises a water soluble alkyd polymer and at least one surfactant. Substantially all or all of the alkyd polymer is present in the shell of the latex particle and substantially none or none or the alkyd polymer is present in the core of the latex particle. Also described is a process for making the latex particle wherein the water soluble alkyd polymer is present as a co-surfactant during polymerization.

20 Claims, 7 Drawing Sheets

Tg (°C) vs % Alkyd

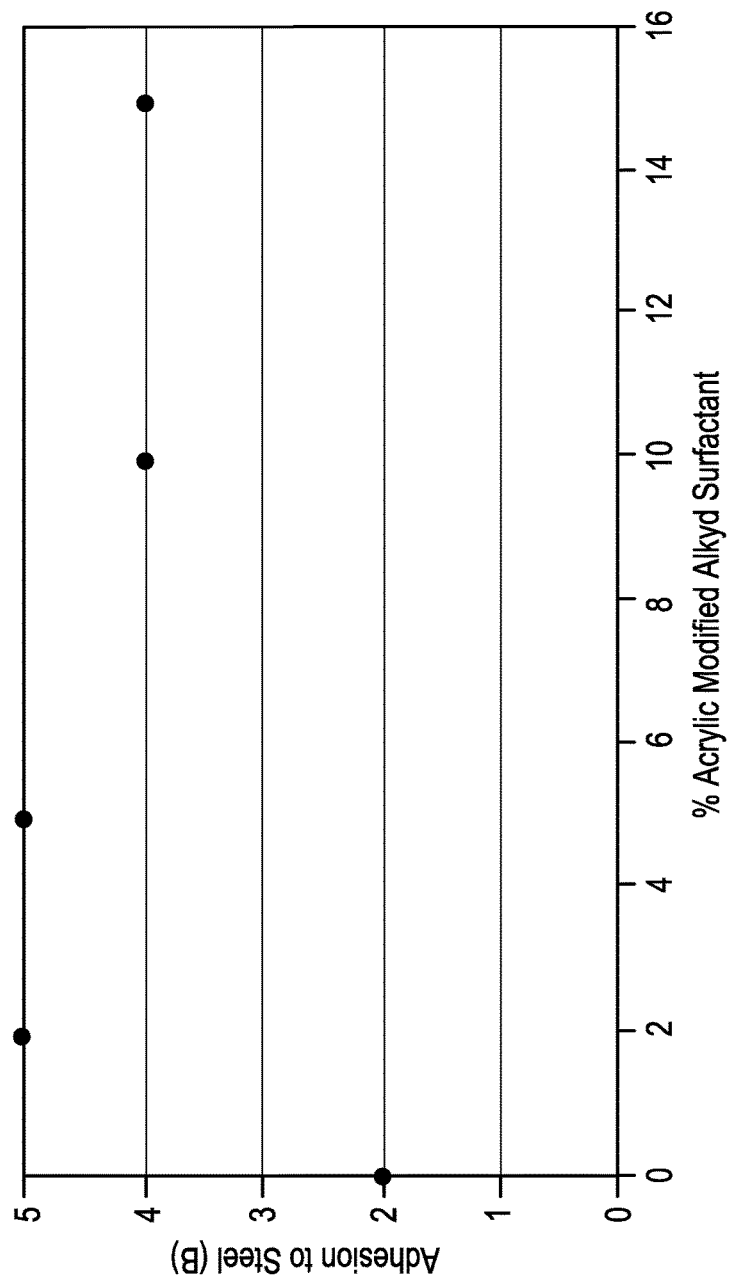

LATEX COMPRISING WATER-SOLUBLE ACRYLIC MODIFIED ALKYD DISPERSION AND METHOD OF PRODUCTION THEREOF

CROSS-REFERENCE TO RELATED APPLICATIONS

This application is a national stage application under 35 U.S.C. § 371 of PCT/US2015/057929 filed Oct. 29, 2015, which claims benefit to U.S. patent application Ser. No. 62/074,117, filed Nov. 3, 2014.

FIELD OF THE INVENTION

Core-shell latex particles having a shell comprising a water-soluble acrylic modified alkyd polymer and at least one surfactant and methods for making the same are described herein.

BACKGROUND OF THE INVENTION

The use of waterborne polymer dispersions in the coatings industry has increased significantly due to an industry effort to develop coating formulations containing little or no volatile organic compounds (VOC). Moving from organic solvent-based compositions to aqueous compositions brings health and safety benefits. However, coating manufacturers and customers desire aqueous coating compositions that achieve the same as or better performance standards than previous solvent-based compositions.

Waterborne polymer dispersions have been prepared from various polymers including vinyl polymers, acrylic polymers, and alkyd polymers. In use, alkyd polymers tend to exhibit excellent film forming ability and adhesion due to their low molecular weight, flexibility, and oxidative self-crosslinking. As a result, a film coating comprising an alkyd resin has very high gloss. However, alkyd polymers have relatively slow cure times, particularly at ambient temperatures. In contrast, vinyl and acrylic polymers have fast cure times but suffer poor gloss and adhesion. For the vinyl and acrylic polymers, attempts to enhance gloss and adhesion by lowering the glass transition temperature of the vinyl and acrylic polymer film often leads to film softness and poor dirt pick-up properties. Therefore, coating manufacturers seek to impart alkyd attributes to vinyl and acrylic polymers.

For example, U.S. Patent Application Publication 20110144258 describes waterborne polymer combinations that physically blend acrylic polymers with waterborne alkyds. However, such combinations typically fail to provide the desired performance due to phase incompatibility between alkyd and acrylic polymers, thus leading to a large scale phase separation in the micron range during film formation. Avoiding a large scale phase separation during film formation is desirable. Further, U.S. Pat. No. 6,333,378 discloses using a mini-emulsion process to produce hybrid alkyd/acrylic emulsions. The mini-emulsion process requires the use of specialized equipment such as a microfluidizer.

In U.S. Pat. No. 6,333,378, the latex particles comprise a core/shell structure wherein the core comprises an acrylic-based polymer and an alkyd polymer and the shell comprises a surfactant. The alkyd polymer is in the core of the particle rather than the shell.

U.S. Patent Application Publication 20110144258 teaches the physical blending of an alkyd polymer with an acrylic-based polymer after the acrylic based polymer has already been formed (i.e., after polymerization).

The present inventors have found that using an alkyd polymer as a co-surfactant during polymerization of an acrylic or vinyl monomer results in improved film formation properties for the latex that is produced.

The inventors further surprisingly found that configuration of the latex particle, and in particular, the placement of the alkyd polymer in the shell of a core-shell particle favorably impacts performance properties of a latex formed with the latex particles.

In the latex particles of the present invention, the acrylic modified alkyd polymer is located in the shell of the core/shell polymer and coats the core of the particle.

In the latex particles of the prior art that are produced using processes wherein post-polymerization addition of an alkyd polymer occurs, the alkyd polymer does not coat the acrylic-based polymer, thereby resulting in a large scale, micron range phase separation, therefore less desirable film formation properties.

SUMMARY OF THE INVENTION

The present invention is directed to a latex particle comprising a core and a shell surrounding the core. The core comprises an acrylic and/or vinyl polymer and the shell comprises water soluble alkyd polymer and at least one surfactant. The core shell latex particle is configured such that substantially none of the alkyd polymer is in the core and substantially all of the alkyd polymer is in the shell of the latex particle.

In one feature of the composition of the invention, the acrylic and/or vinyl polymer in the core is selected from the group consisting of one or more of an alkyl (meth) acrylate monomer, vinyl monomer, styrene, alkyl substituted styrene, a mono ethylenically unsaturated carboxylic acid monomer, a phosphorous containing monomer, or a sulfur containing monomer.

In another feature, the alkyd polymer is introduced into the outer shell of the latex particle by maintaining a presence of the alkyd polymer during polymerization of a monomer precursor of the core polymer. In an additional feature, the latex particle is film-forming. In a further feature, the alkyd polymer is acrylic modified and has been neutralized by a base compound or modified with hydrophilic moieties. The basic compound may be selected from the group consisting of ammonium hydroxide, triethyl amine, n-methyl morpholine, n,n-dimethyl ethanol amine, lithium hydroxide, sodium hydroxide, and potassium hydroxide.

In yet another feature, the particle size ranges from about 5 nm to about 700 nm. In an additional feature, the pH of the particle ranges from about 5 to about 9. In a still further feature, the glass transition temperature (Tg) of the particle ranges from about −70° C. to about 100° C.

In another aspect of the invention, a process for forming the latex particle, which is film-forming, comprises polymerizing a monomer precursor of the core polymer in the presence of the water soluble alkyd polymer and the at least one surfactant. The alkyd polymer is introduced to a polymerization reactor as an initial charge prior to polymerization. In an additional feature, the alkyd polymer is also introduced to the polymerization reactor during polymerization. In yet another feature, the alkyd polymer is introduced to a polymerization reactor in combination with a monomer precursor of the core polymer.

In another aspect of the invention, a coating composition comprises the latex particle. In a feature of this aspect, the coating composition comprises less than 10% solvent. In another feature, the composition is substantially solvent free.

In yet a further feature, the alkyd polymer comprises from about 0.5% to about 25% of the coating composition, by weight.

In a further aspect of the invention, a film comprising the coalesced latex particles has a film formation temperature of about −70° C. to about 100° C. The film has a glass transition temperature (Tg) of about −30° C. to about 100° C.

In another aspect of the invention, the latex particle may be used in a coating, paint, ink and/or adhesive. The coatings, paint, ink, or adhesives may be applied to interior or exterior surfaces, wherein the surfaces are selected from the group consisting of metal, asphalt, concrete, stone, ceramic, wood, plastic, polymer, and combinations thereof. The coatings, paint, ink, or adhesives may also be applied to surfaces of rail cars, agricultural machinery, automobile parts, log cabins and/or decks. The latex particle may be used for automotive, industrial, construction and/or residential housing applications.

BRIEF DESCRIPTION OF THE DRAWINGS

FIG. 7 is a plot of adhesion to steel of white paint versus concentration of alkyd polymer in the paint in Example 5.

DETAILED DESCRIPTION

Figure 1:
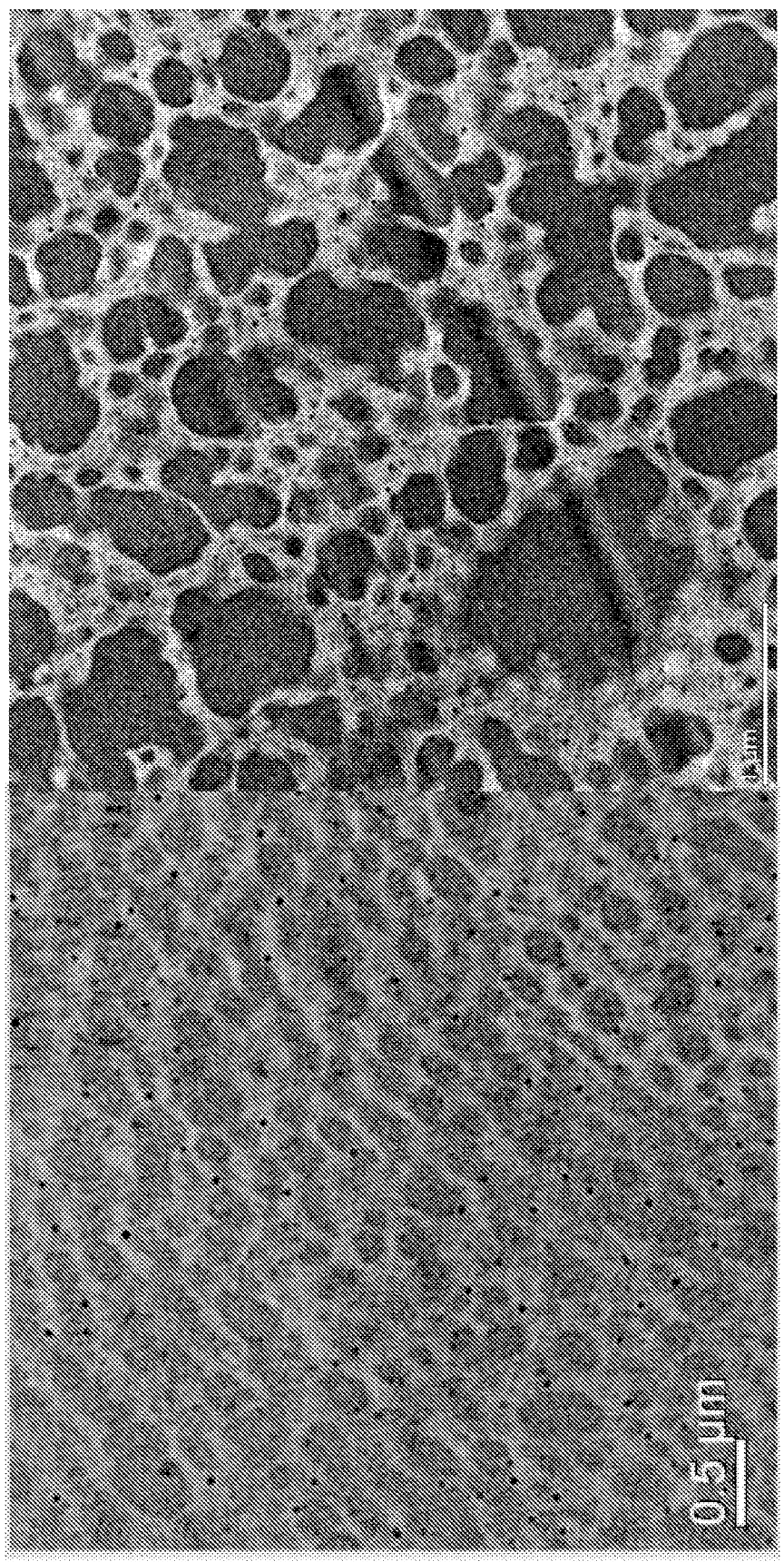
FIG. 1 is a photograph of transmission electron microscopy comparing a film formed with a latex of the present invention (left side) and a film formed with the latex of U.S. Patent Application Publication No. 20110144258 (right side).

The invention relates to latex particles comprising an acrylic or vinyl polymer, an alkyd polymer, and a surfactant. The latex particles may be used in a water based latex.

The latex particles generally have a spherical shape including, but not limited to, core/shell particles. In a preferred embodiment, in the latex particle, the core comprises an acrylic or vinyl polymer and the shell comprises an alkyd polymer and a surfactant. In another preferred embodiment, the core may consist essentially of or may consist of an acrylic or vinyl polymer and the shell may consist essentially of or consist of an alkyd polymer and a surfactant. It is further preferred that a majority, substantially all, or all of the alkyd polymer is present in the shell of the latex particle (as opposed to the core). For example, it is preferred that at least 50% or more, at least 60% or more, at least 70% or more, or at least 80% or more, or at least 90% or more of the alkyd polymer is present in the shell of the latex particle.

In another embodiment of the latex particle of the invention, substantially none or none of the alkyd polymer is in the core. For example, it is preferred that not more than 50% or less, not more than 40% or less, not more than 30% or less, or not more than 20% or less, or not more than 10% or less, not more than 5% or less, not more than 3% or less, not more than 2% or less, not more than 1% or less, of the alkyd polymer is present in the core of the latex particle.

It is further preferred that the alkyd polymer is water soluble. For example, the alkyd polymer may be an acrylic modified alkyd polymer.

It is further preferred that the alkyd polymer have an acid value of from 5 to 100 mg KOH/g, more preferably from 20-60 mg KOH/g, even more preferably from 35 to 55 mg KOH/g. In the latex particle, the core comprises about 20 to about 99.8 wt % of the total weight of the particle, and the shell comprises about 0.2 to about 80 wt % of the total weight of the particle. It is preferred that the core comprises about 80 to about 99.5 wt % of the total weight of the particle and the shell comprises about 0.5 to about 20 wt % of the total weight of the particle. It is more preferred that the core comprises about 85 to about 99 wt % of the total weight of the particle and the shell comprises about 1 to about 15 wt % of the total weight of the particle.

The average particle size of the latex particle measured by a laser light scattering may range from about 5 nm to about 700 nm. Preferred particle sizes range from about 25 nm to about 400 nm, more preferably from about 100 nm to about 250 nm.

The pH of the latex may range from about 4 to about 10, with preferred pH ranging from about 5 to 9, more preferably from about 6 to about 8.

The glass transition temperature (Tg) of the latex particle ranges from about −70° C. to about 100° C. In a preferred embodiment of the invention, where film formation of a latex comprising the latex particles at ambient temperatures is desirable, the glass transition temperature may preferably be under about 70° C., and most preferably between about 0-60° C. Advantageously, in a preferred embodiment of a latex comprising the latex particles of the present invention, the film formation temperature of the latex decreases as the concentration of acrylic modified alkyd polymer in the latex particle increases. Further, the glass transition temperature (Tg) of the latex particle decreases as the concentration of acrylic modified alkyd polymer in the latex particle increases. Further, a latex produced with the latex particles of the invention typically has a solids concentration of about 30 to 70%, preferably of about 35 to 60%, more preferably of about 40 to about 55% and a Brookfield viscosity of about 80 to about 2,000 centipoises, preferably of about 100 to 1000 centipoises more preferably of about 150 to 500 centipoises.

A latex comprising the latex particles of the present invention exhibits improved film formation properties relative to conventional latexes containing latex particles that have a combination of acrylic or vinyl polymers and surfactant(s). The latex particles of the present invention have a core/shell structure wherein the core comprises an acrylic or vinyl polymer and the shell comprises an acrylic modified alkyd polymer and at least one surfactant. Without being bound by theory, it is believed that the improved film formation can be achieved because during film formation of a latex comprising the latex particles, the alkyd polymer in the shell of the core/shell may act at least in part as a plasticizer, thereby promoting coalescence of the latex particles, and film formation with reduced interstitial voids. After film formation, the alkyd polymer increases its molecular weight by oxidative crosslinking to eliminate film tackiness and build hardness. In order to achieve the maximum benefit of alkyd modification on latex film properties, preferably the acrylic or vinyl polymer has good phase mixing with alkyd polymer.

Improved phase mixing between acrylic polymer and alkyd polymer can be seen in FIG. 1, which is a photograph of transmission electron microscopy comparing a film formed with a latex of the present invention (left side) and a film formed with the latex of U.S. Publication No. 20110144258 (right side), wherein the latex is formed by post-polymerization blending of an alkyd polymer and an acrylic-based polymer. In the photographs, the darker areas represent the alkyd polymer in the film. As can be seen in the photographs, there is a more uniform distribution of alkyd polymer in the film of the present invention than in the film produced with the latex of U.S. Publication No. 20110144258. The uneven distribution of alkyd polymer and the presence of large micron size alkyd polymer phase for the prior art latex are indicative of poor phase mixing that likely leads to poorer performance characteristics.

The latex particles of the invention are prepared by polymerization of at least one ethylenically-unsaturated monomer in the presence of a water soluble alkyd polymer and at least one surfactant. Any polymerization process known in the art may be used. The polymerization may take place as a single stage or multi-stage feed. If a multi-stage feed is used, one or more stages may contain an ethylenically-unsaturated monomer. Different ethylenically-unsaturated monomers may be used in different stages. Copolymers may be used as the core portion of the latex particle and may be prepared by copolymerizing different ethylenically-unsaturated monomers. Preferably an emulsion polymerization process is used.

Latex Particle Shell

The shell of latex particle structure comprises a water soluble alkyd polymer and at least one surfactant. The water-soluble alkyd polymer for use in forming the latex particle of the present invention may be any alkyd polymer that may be miscible with water without phase separation at 25° C. for at least 1 week. Alkyd polymer becomes water-soluble after neutralization by a neutralization agent, such as, for example, a metal neutralizing agent or a basic compound. Alkyd polymer also becomes water-soluble after being covalently modified with hydrophilic moieties. For example, the alkyd polymer may be covalently modified using polyalkylene oxide polyol, (meth) acrylic polyalkylene oxide and/or acrylamide monomer.

A suitable water-soluble alkyd polymer for use in the present invention may include, for example, Synaqua® 821-1377 and Synaqua® 821-2241, which are commercially available from Arkema Inc.

A urethane-alkyd dispersion, an epoxy dispersion, and/or a polyurethane dispersion may also be used as a co-surfactant in a polymerization reaction. Such co-surfactants may be used in addition to a water soluble alkyd polymer during polymerization.

An alkyd polymer is typically hydrophobic. It is preferred for this invention that the alkyd polymer is more hydrophilic in nature for sufficient water-solubility. Accordingly, it is preferred that the water soluble alkyd polymer have an acid value of from 5 to 100 mg KOH/g, more preferably from 20 to 60 mg KOH/g, even more preferably 40 to 55 to provide more hydrophilicity. It is further preferred that the water soluble alkyd polymer is an acrylic modified water soluble alkyd polymer.

The acrylic modified alkyd polymer may be prepared in a multi-step process as follows: preparation of an alkyd polymer, preparation of an acrylic modified fatty acid, and reaction of the alkyd polymer with the acrylic modified fatty acid under polymerization conditions. To prepare the alkyd polymer, a polyol, at least one fatty acid, and at least one polycarboxylic acid or anhydride are reacted at a temperature of between about 180° C. and about 250° C. until the desired acid value and viscosity are achieved. Optionally, a mono-carboxylic acid may be included in the reaction. The acid value of the alkyd polymer is from about 4 to about 15 and the viscosity of the alkyd polymer is from about 100 poise to about 10,000 poise.

The polyol may be selected from aliphatic, alicyclic and aryl alkyl polyols. Suitable examples of polyols include, but are not limited to, ethylene propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, dipentaerythritol, sorbitol, glycerine, dimethylolpropionic acid, and the like. Preferred polyols include hydrogenated bisphenol A and pentaerythritol.

The fatty acid may be any suitable fatty acid or mixture of fatty acids.

The polycarboxylic acid or anhydride may be selected from the group consisting of isophthalic acid, terephthalic acid, phthalic anhydride, adipic acid, tetrachlorophthalic anhydride, tetrahydrophthalic anhydride, dodecane dioic acid, sebacic acid, acelaic acid, 1,4-cyclohexane dicarboxylic acid, 1,3-cyclohexane dicarboxylic acid, maleic anhydride, fumaric acid, succinic anhydride, trimellitic anhydride, pyromellitic dianhydride, 2,6-naphthalene dicarboxylic acid, and glutaric acid.

A suitable water-soluble acrylic modified alkyd polymer may comprise the following composition:
1) 20-70% by weight of acrylic modified fatty acid(s), more preferably from 40 to 60% by weight.
2) 5-60% by weight of unsaturated fatty acid(s), more preferably from 20 to 40% by weight.
3) 5-30% by weight of polyol compounds having 2 to 6 hydroxy groups, more preferably from 10 to 20% by weight.
4) 5-30% by weight of aromatic or aliphatic acids or anhydrides having 1 to 3 carboxylic groups, more preferably from 10 to 20% by weight.
5) 0-20% by weight of polyalkyleneoxide polyol compounds having 1 to 3 hydroxy groups, more preferably from 0 to 10% by weight.
6) 0-5.0% by weight of basic compound, more preferably from 1.0 to 3.0% by weight.

The reaction may be conducted in a suitable solvent, such as methyl amyl ketone.

To prepare the acrylic modified fatty acid, generally at least one fatty acid and at least one (meth) acrylic-functional monomer are reacted. Optionally, organic solvent can be added to the reaction. The reaction takes place at a temperature of between about 140° C. and about 180° C. until the desired viscosity is achieved. The viscosity of the acrylic modified fatty acid is from about 100 poise to about 100,000 poise at 25° C.

Suitable examples of fatty acids for the preparation of the acrylic modified fatty acid include, but are not limited to, linoleic acid, dehydrated castor oil fatty acid, tallow acid, soya acid, myristic acid, linseed acid, crotonic acid, versatic acid, coconut acid, tall fatty acid, rosin acid, neodecanoic acid, neopentanoic acid, isostearic acid, 12-hydroxystearic acid, cotton seed acid, and the like.

The acrylic-functional monomers include, but are not limited to, acrylic acid, methacrylic acid, methyl methacrylate, isobutyl methacrylate and the like. Preferably, a mixture of acrylic-functional monomers is used, optionally with the admixture of further unsaturated monomers such as vinyl-functional monomers, such as, for example styrene and vinyl toluene.

The acrylic modification of the fatty acid may be conducted with or without a solvent; however, an appropriate initiator may be present. Further, a chain transfer agent may also be present.

An example of an initiator for the reaction is di-t-butyl peroxide. However, other initiators, known to be active for the reaction, can be used.

A potential chain transfer agent may be n-dodecyl mercaptan, although other substances may also be used.

A suitable acrylic modified fatty acid may comprise the following composition:

1) 20-60% by weight of unsaturated fatty acid(s), more preferably from 40 to 50% by weight.
2) 3-20% by weight methacrylic acid, more preferably from 8 to 15% by weight;
3) 0-20% by weight of polyoxyalkylene (meth)acrylate and/or (meth) acrylamide, more preferably from 0 to 10% by weight.
4) 0-35% by weight of styrene or alkyl substituted ne, more preferably from 10 to 25% by weight.
5) 10-50% by weight of other (meth)acrylate monomers, more preferably from 10 to 25% by weight.

In the last step of the preparation of the acrylic-modified alkyd polymer, the alkyd polymer and the acrylic modified fatty acid are reacted to form the acrylic modified alkyd polymer at elevated temperature in the presence of a solvent, for example, methyl amyl ketone. The acrylic modified alkyd polymer can be dissolved in a mixture of water and a neutralization agent such as a basic compound. Exemplary basic neutralization compounds include, but are not limited to, ammonium hydroxide, triethyl amine, n-methyl morpholine, n,n-dimethyl ethanol amine, lithium hydroxide, sodium hydroxide, and potassium hydroxide. In a preferred embodiment, the basic neutralization compound is sodium hydroxide.

Advantages of using metal hydroxides as neutralization compounds include the ability to prepare the latex particle of the present invention in low pH environments (for example, pH of lower than 7.0) and lower, odor of the resulting water-soluble alkyd polymer.

The acrylic modified alkyd polymer is generally used at a concentration of from about 0.5 to about 50 wt % based on the total weight of the latex. It is preferred that the concentration of the acrylic modified alkyd polymer is from about 0.5% to about 20 wt %. It is more preferred that the concentration is from about 1% to about 15%. The acrylic modified alkyd polymer can be added prior to the addition of any monomer charge, during the addition of a monomer charge or a combination thereof.

One or more nonionic or ionic (e.g., cationic, anionic) emulsifiers, or surfactants, must be used as a co-surfactant with the water soluble acrylic modified alkyd polymer during polymerization. Substantially all, or all of the at least one surfactant is located in the shell of the latex particles formed during polymerization. Examples of suitable nonionic emulsifiers include tert-octylphenoxyethylpoly(39)-ethoxyethanol, dodecyloxypoly(10)ethoxyethanol, nonyl-phenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)phenoxypoly(20) ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with 30 moles of ethylene oxide, N-polyoxyethylene (20)lauramide, N-lauryl-N-polyoxyethylene(3)amine and poly(10)ethylene glycol dodecyl thioether. Examples of suitable ionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, palmitic acid, palmitoleic acid, stearic acid, oleic acid, linoleic acid, linolenic acid, mixtures of fatty acids (e.g., linseed oil fatty acid), sodium or ammonium salts of phosphate esters of ethoxylated nonylphenol, sodium octoxynol-3-sulfonate, sodium cocoyl sarcocinate, sodium 1-alkoxy-2-hydroxypropyl sulfonate, sodium α-olefin ($C_{14}$-$C_{16}$)sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate.

The one or more emulsifiers or surfactants are generally used at a level of up to 10 percent based on the weight of the monomers. The one or more emulsifiers or surfactants can be added prior to the addition of any monomer charge, during the addition of a monomer charge or a combination thereof.

Latex Particle Core

The core of the latex particle is generally located at or near the center of the particle. The core comprises acrylic or vinyl polymers. Suitable acrylic or vinyl polymers include homopolymers or copolymers derived from one or more ethylenically-unsaturated monomers. Exemplary ethylenically-unsaturated monomers include (meth)acrylate monomers, vinyl aromatic monomers (e.g., styrene), ethylenically unsaturated aliphatic monomers (e.g., butadiene), vinyl ester monomers (e.g., vinyl acetate), and combinations thereof.

In some embodiments, the (meth)acrylate monomer can include esters of α,β-monoethylenically unsaturated monocarboxylic and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C20, C1-C12, or C1-C4 alkanols). Exemplary acrylate and (meth)acrylate monomers include, but are not limited to, methyl acrylate, methyl (meth) acrylate, ethyl acrylate, ethyl (meth) acrylate, butyl acrylate, butyl (meth)acrylate, isobutyl (meth)acrylate, n-hexyl (meth)acrylate, ethylhexyl (meth)acrylate, n-heptyl (meth) acrylate, ethyl (meth)acrylate, 2-methylheptyl (meth)acrylate, octyl (meth)acrylate, isooctyl (meth)acrylate, n-nonyl (meth)acrylate, isononyl (meth)acrylate, n-decyl (meth) acrylate, isodecyl (meth)acrylate, dodecyl (meth)acrylate, lauryl (meth)acrylate, tridecyl (meth)acrylate, stearyl (meth) acrylate, glycidyl (meth)acrylate, alkyl crotonates, vinyl acetate, di-n-butyl maleate, di-octylmaleate, acetoacetoxyethyl (meth)acrylate, acetoacetoxypropyl (meth)acrylate, hydroxyethyl (meth)acrylate, allyl (meth)acrylate, tetrahydrofurfuryl (meth) aery late, cyclohexyl (meth)acrylate, 2-ethoxyethyl (meth)acrylate, 2-methoxy (meth)acrylate, 2-(2-ethoxyethoxy)ethyl (meth)acrylate, 2-ethylhexyl (meth)acrylate, 2-propylheptyl (meth)acrylate, 2-phenoxyethyl (meth)acrylate, isobornyl (meth)acrylate, capro lactone (meth)acrylate, polypropyleneglycol mono(meth)acrylate, polyethyleneglycol (meth)acrylate, benzyl (meth)acrylate, 2,3-di(acetoacetoxy)propyl (meth)acrylate, hydroxypropyl (meth)acrylate, methylpolyglycol (meth)acrylate, 3,4-epoxycyclohexylmethyl (meth)acrylate, 1,6 hexanediol di(meth)acrylate, 1,4 butanediol di(meth)acrylate and combinations thereof.

In some embodiments, the vinyl monomer can include a vinyl aromatic having up to 20 carbon atoms, a vinyl ester of a carboxylic acid comprising up to 20 carbon atoms, a (meth)acrylonitrile, a vinyl halide, a vinyl ether of an alcohol comprising 1 to 10 carbon atoms, an aliphatic hydrocarbon having 2 to 8 carbon atoms and one or two double bonds, a silane-containing monomer, a (meth)acrylamide, a (meth)acrylamide derivative, a sulfur-based monomer, or a combination of these monomers. Suitable vinyl aromatic compounds include styrene, a- and p-methylstyrene, a-butylstyrene, 4-n-butylstyrene, 4-n-decylstyrene, vinyltoluene, and combinations thereof. Vinyl esters of carboxylic acids comprising up to 20 carbon atoms include, for example, vinyl laurate, vinyl stearate, vinyl propionate, versatic acid vinyl esters, vinyl acetate, and combinations thereof. The vinyl halides can include ethylenically unsaturated compounds substituted by chlorine, fluorine or bromine, such as vinyl chloride and vinylidene chloride. The vinyl ethers can include, for example, vinyl ethers of alcohols comprising 1 to 4 carbon atoms, such as vinyl methyl ether or vinyl isobutyl ether. Aliphatic hydrocarbons having 2 to 8 carbon atoms and one or two double bonds can include, for example, hydrocarbons having 4 to 8 carbon atoms and two olefinic double bonds, such as butadiene, isoprene, and chloroprene. Silane containing monomers can include, for example, vinyl silanes, such as vinyltrimethoxysilane, vinyltriethoxysilane, vinyl tris(2-methoxyethoxysilane), and vinyl triisopropoxysilane, and (meth)acrylatoalkoxysilanes, such as (meth)acryloyloxypropyltrimethoxysilane, γ-(meth)acryloxypropyltrimethoxysilane, and Y-(meth)acryloxypropyltriethoxysilane.

Preferably, the latex particles of the invention are prepared under emulsion polymerization conditions. As mentioned above, the polymerization may take place as a single stage or multi-stage feed. If a multi-stage feed is used, one or more stages may contain an ethylenically-unsaturated monomer or monomers. Further, the water soluble acrylic modified alkyd polymer may be added in a single stage or a multi-stage feed. However, it is important that at least some amount of water soluble acrylic modified alkyd polymer is present during polymerization. For example, the water soluble acrylic modified alkyd polymer may be added in the initial reactor charge and/or with the ethylenically-unsaturated monomer. It may also be added during polymerization, either alone or in combination with another feed stream.

Having the acrylic modified alkyd polymer present during polymerization enables formation of the latex particles of the present invention wherein the core of the particle comprises an acrylic or vinyl polymer and the shell of the particle comprises the acrylic modified alkyd polymer and at least one surfactant. Further, the emulsion polymerization may take place as a batch, semi-batch, or continuous process. The emulsion polymerization may take place at temperatures ranging from about 60° C. to about 90° C. The emulsion polymerization process may take from about 120 minutes to about 10 hours.

The polymerization process may also require an initiator, a reducing agent, a catalyst, and/or other components. Suitable initiators include conventional initiators such as ammonium persulfate, ammonium carbonate, hydrogen peroxide, t-butylhydroperoxide, ammonium or alkali sulfate, di-benzoyl peroxide, lauryl peroxide, di-tertiarybutylperoxide, 2,2'-azobisisobuteronitrile, benzoyl peroxide, and the like.

Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to, ferrous sulfate heptahydrate, ferrous chloride, cupric sulfate, cupric chloride, cobalt acetate, cobaltous sulfate, and mixtures thereof.

As mentioned previously, a conventional surfactant or a combination of surfactants is required as a co-surfactant during polymerization of the vinyl or acrylic monomer.

In general, the acrylic modified alkyd polymer portion of a latex comprising the latex particle of the present invention represents about 0.5-50 wt %, preferably about 0.5-20 wt %, more preferably about 1-15 wt % of the total solids of the latex while the acrylic or vinyl polymer portion of the latex represents about 50-99.5 wt %, preferably about 80-99.5 wt %, more preferably about 85-99 wt % of the total solids of the latex.

Such latexes can be further used in coating compositions. A coating composition of the invention contains a latex comprising a latex particle of the invention and may be prepared by techniques known in the art. Examples of coating compositions include, for example, architectural coatings, maintenance coatings, industrial coatings, automotive coatings, textile coatings, inks, adhesives, and coatings for paper, wood, and plastics. Coating compositions of the invention contain significantly less solvent, less than 25 wt % to as low as 1 wt % and even zero VOC content. The coating compositions of the invention produce coatings that have high gloss, fast cure, and good corrosion resistance.

The coating composition may be coated onto a substrate and cured using techniques known in the art (e.g. by spray-applying 3 to 4 mils of wet coating onto a metal panel, and heating in a 150° C. forced air oven for 30 minutes or curing with a metal drier at ambient condition). The substrate can be any common substrate such as paper, polymer, metals, glass, urethane elastomers and primed (painted) substrates, and the like. The coating composition of the invention may be cured at room temperature (ambient cure), at elevated temperatures (thermal cure), or photochemically cured.

A coating composition of the invention may further contain coating additives. Examples of such coating additives include, but are not limited to, one or more leveling, rheology, and flow control agents such as silicones, fluorocarbons or cellulosics; extenders; reactive coalescing aids; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005.

Examples of flatting agents include, but are not limited to, synthetic silica, polypropylene, and synthetic silicate.

Examples of dispersing agents and surfactants include, but are not limited to, sodium bis(tridecyl) sulfosuccinnate, di(2-ethylhexyl) sodium sulfosuccinnate, sodium dihexyl-sulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetra-sodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, hydroxypropyl methyl cellulose, ethyl hydroxyethyl cellulose, polyethylene oxide, guar gum and the like. Other examples of thickeners include the methylene/ethylene oxide associative thickeners and water soluble carboxylated thickeners.

Several antifoaming agents are commercially available including, for example, BUBREAK® of Buckman Laboratories Inc., BYK® of BYK Chemie, U.S.A., FOAMASTER® of BASF Corporation, DREWPLUS® of Ashland Chemical Company, TRYSOL® and TROYKYD® of Troy Chemical Corporation, and SAG® of Momentive Performance Materials, Inc.

Examples of fungicides, mildewcides, and biocides include, but are not limited to, 4,4-dimethyloxazolidine, 3,4,4-trimethyloxazolidine, modified barium metaborate, potassium N-hydroxy-methyl-N-methyldithiocarbamate, 2-(thiocyano-methylthio)benzothiazole, potassium dimethyl dithiocarbamate, adamantane, N-(trichloromethylthio) phthalimide, 2,4,5,6-tetrachloro-isophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of UV absorbers and UV light stabilizers include among others substituted benzophenone, substituted benzotriazoles, hindered amines, and hindered benzoates, and diethyl-3-acetyl-4-hydroxy-benzyl-phosphonate, 4-dodecyloxy-2-hydroxy benzophenone, and resorcinol monobenzoate.

Examples of solvents and coalescing agents are well known and include but are not limited to ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol mono-isobutyrate, ethylene glycol mono-octyl ether, diacetone alcohol, TEXANOL® ester alcohol (Eastman Chemical Company), and the like.

Pigments suitable for use in the coating compositions are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to, the following: titanium dioxide, barytes, clay, or calcium carbonate, CI Pigment White 6 (titanium dioxide); CI Pigment Red 101 (red iron oxide); CI Pigment Yellow 42; CI Pigment Blue 15, 15:1, 15:2, 15:3, 15:4 (copper phthalocyanines); CI Pigment Red 49:1; and CI Pigment Red 57:1. Colorants such as phthalocyanine blue, molybdate orange, or carbon black are also suitable for the coating compositions of the invention.

An exemplary process for producing the latex particles of the present invention is described in the following non-limiting examples.

EXAMPLES

Example 1

Example 1 provides an exemplary process for producing an acrylic modified alkyd polymer. The first step in producing the acrylic modified alkyd polymer was producing an alkyd polymer.

| Charge | Ingredient | Weight (g) |
| --- | --- | --- |
| A | m-Pentaerythritol | 688 |
|  | Hydrogenated Bisphenol A | 737 |
|  | Benzoic acid | 164 |
|  | Dehydrated castor oil fatty acid | 737 |
|  | Soybean oil fatty acid | 622 |
|  | Methyl amyl ketone | 50 |
|  | Isophthalic acid | 819 |

The alkyd polymer was produced as follows. Charge A was added into a flask equipped with a nitrogen blanket and a reflux condenser. The temperature was raised to 225° C. while collecting forming water in a Dean-Stark trap. The temperature was maintained until the acid value was 5.64 and the viscosity was $Z_2^-$ at 80NVM in methyl amyl ketone.

The next step was producing acrylic modified fatty acids. The acrylic modified fatty acids were produced as follows.

| Charge | Ingredient | Weight (g) |
| --- | --- | --- |
| (A) | Linoleic acid (Pamolyn 200) | 500 |
|  | Dehydrated castor oil fatty acid | 1000 |
| (B) | Styrene | 556 |
|  | Isobutyl methacrylate | 706 |
|  | Methacrylic acid | 450 |
|  | Di-t-butyl peroxide | 50 |

Charge (A) was added into a flask equipped with a nitrogen blanket. The temperature was raised to 160° C. Charge (B) was added into a flask over a period of 5.5 hours while maintaining the temperature at 160° C. The reaction was held for 2.5 hours after the addition of Charge (B) was completed, then cooled. The viscosity was $Z_1^+$ at 80NVM in methyl amyl ketone.

The alkyd polymer and the acrylic modified fatty acids produced above were combined and then neutralized to form a neutralized acrylic modified alkyd polymer as follows.

| Charge | Ingredient | Weight (g) |
|---|---|---|
| (A) | Alkyd | 180 |
| | Acrylic modified Fatty acids | 200 |
| (B) | De-ionized water | 465 |
| | 10% NaOH in water | 70 |

Charge (A) was added to a flask equipped with a nitrogen blanket and a water-receiver. The temperature was raised to 210° C. while collecting forming water and methyl amyl ketone. The temperature was maintained until the acid value was 38.4 and the viscosity was $Z$-$Z_1$ at 70NVM in methyl amyl ketone. The temperature was lowered below 100° C., and then Charge (B) was added. The resulting dispersion had the NVM of 41.0, viscosity of 1750 cps, pH value of 8.19, and particle size of 133 nm.

Example 2

Latexes comprising latex particles of the present invention were prepared in Example 2 using the acrylic modified alkyd polymer produced in Example 1 above during emulsion polymerization. In this example, the acrylic modified alkyd polymer was added to the polymerization reactor as an initial charge.

Varying amounts of the acrylic modified alkyd polymer of Example 1 were added as an initial charge. In particular, acrylic modified alkyd polymer was added in amounts of 2 and 5 parts per hundred parts of acrylic monomers as the initial charge.

The acrylic modified alkyd polymer was added to the reactor as a part of the initial reactor charge, which contained the prescribed amount of initial alkyd polymer, initial buffer, and water. The initial charge was heated to 80° C. Once at temperature, an initial oxidizer was added, followed by a 5 minute hold time. Following the hold time, a pre-emulsion feed containing a monomer mix, surfactant, and water was fed to the reactor over the course of three hours. An oxidizer was co-fed into the reactor for the same duration as the monomer feed Immediately following the conclusion of the monomer and oxidizer feeds, the residual monomer was reduced to acceptable levels with a redox pair that was fed to the reactor over the course of 30 minutes. Following introduction of the redox pair, ammonia was added to the reactor over the course of 15 minutes. The reactor was cooled to 40° C., and water was added to adjust the solids of the resulting latexes. The target solid content for the resulting latexes was 48-50 wt % solids.

Example 3

Latexes comprising latex particles of the present invention were prepared in Example 3 using the acrylic modified alkyd polymer produced in Example 1 during emulsion polymerization. In contrast to Example 2, in this example, the acrylic modified alkyd polymer was added to the polymerization reactor through the monomer pre-emulsion.

The initial reactor charge containing the prescribed amount of initial surfactant, initial buffer, and water was added to the reactor and heated to 80° C. Once at temperature, the initial oxidizer was added, followed by a 5 minute hold time. Following the hold time, the pre-emulsion feed containing the monomer mix, surfactant, varying amounts of the acrylic modified alkyd polymer, and water was fed over the course of three hours. Acrylic modified alkyd polymer was added in amounts of 2, 5, 10, and 15 parts per hundred parts of acrylic monomers. An oxidizer was co-fed into the reactor for the same duration as the monomer feed Immediately following the conclusion of the monomer and oxidizer feeds, the residual monomer was reduced to acceptable levels with a redox pair fed to the reactor over the course of 30 minutes. Following introduction of the redox pair, ammonia was added to the reactor over the course of 15 minutes. The reactor was cooled to 40° C., and water was added to adjust the solids of the resulting latexes. The target solid content for the resulting latexes was 48-50 wt % solids.

Properties of the latexes resulting from Examples 2 and 3 are shown in Table 4.

TABLE 4

| | | Latex Properties | | | | | | | | |
|---|---|---|---|---|---|---|---|---|---|---|
| Resin | | Particle size (μm) | | Viscosity | FS | | Residual Monomer (ppm) | | Alkyd Surfactant | |
| ID | Solids % | Mv | Mn | (cps) | 250M | pH | BA | MMA | pph | location |
| 1 | 49.76 | 0.1252 | 0.1077 | 122.5 | 311.7 | 8.29 | 58 | 35 | 0 | None |
| 2 | 50.31 | 0.1331 | 0.1185 | 150 | 157.8 | 7.97 | 120 | 35 | 2 | Feed |
| 3 | 49.36 | 0.1897 | 0.1659 | 90 | 101.6 | 8.05 | 100 | 44 | 2 | IC |
| 4 | 49.79 | 0.1493 | 0.1311 | 152.5 | 371.6 | 7.69 | 287 | 39 | 5 | IC |
| 5 | 49.45 | 0.1301 | 0.1123 | 102.5 | 257.4 | 7.78 | 460 | 214 | 5 | Feed |
| 6 | 48.87 | 0.1665 | 0.1461 | 215 | 259.9 | 7.67 | 181 | 49 | 5 | IC |
| 7 | 48.86 | 0.1436 | 0.1227 | 95 | 1573.5 | 7.52 | 443 | 29 | 10 | Feed |
| 8 | 50.91 | 0.1609 | 0.1350 | 132.5 | 294.1 | 7.54 | 750 | 28 | 15 | Feed |

Feed = alkyd surfactant in monomer pre-emulsion
IC = alkyd surfactant in initial charge
FS-250M = filterable solids through a 250 mesh screen in ppm.
pph = parts per 100 parts of acrylic emulsion solids

Example 4

In Example 4, the latexes that were produced using the acrylic modified alkyd polymer of Example 1, wherein the alkyd polymer was added through the monomer mix were tested to determine film formation temperature and glass transition temperature.

| Resin ID | % Alkyd Surfactant |
|---|---|
| 1 | 0 |
| 2 | 2 |
| 5 | 5 |

| Resin ID | % Alkyd Surfactant |
|---|---|
| 7 | 10 |
| 8 | 15 |

Figure 2:
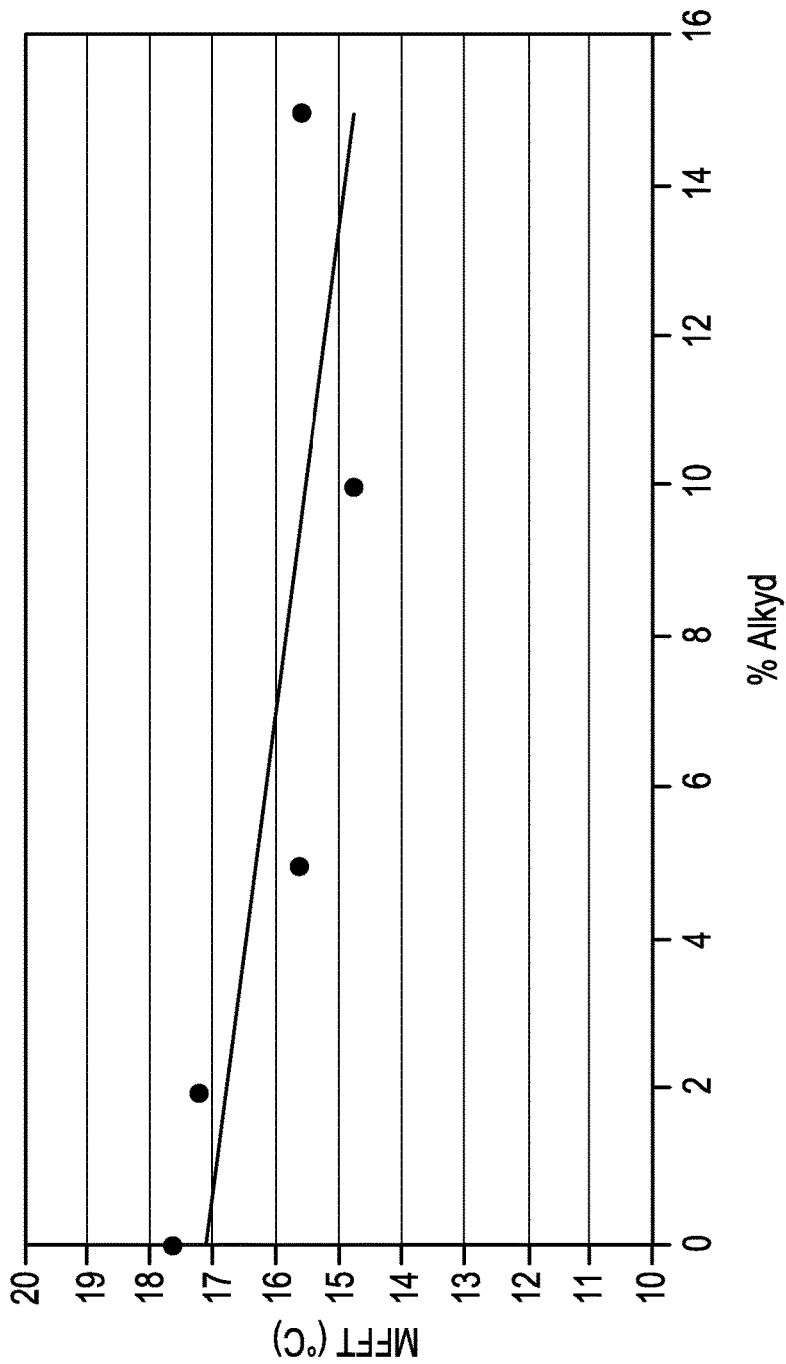
FIG. 2 is a plot of minimum film forming temperature versus concentration of alkyd polymer for exemplary latexes formed in Example 4.

The minimum filming temperature of the latex was measured using ASTM D 2354. In this method, a film is cast over a temperature gradient plate and observed to determine the minimum filming temperature of the emulsion. FIG. 2 is a plot of minimum film forming temperature versus concentration of alkyd polymer. FIG. 2 shows the minimum film forming temperatures of the latexes prepared using 0 to 15% of acrylic modified alkyd polymer during emulsion polymerization. As seen in FIG. 2, the film formation temperature decreases with increasing concentration of alkyd polymer.

Figure 3:
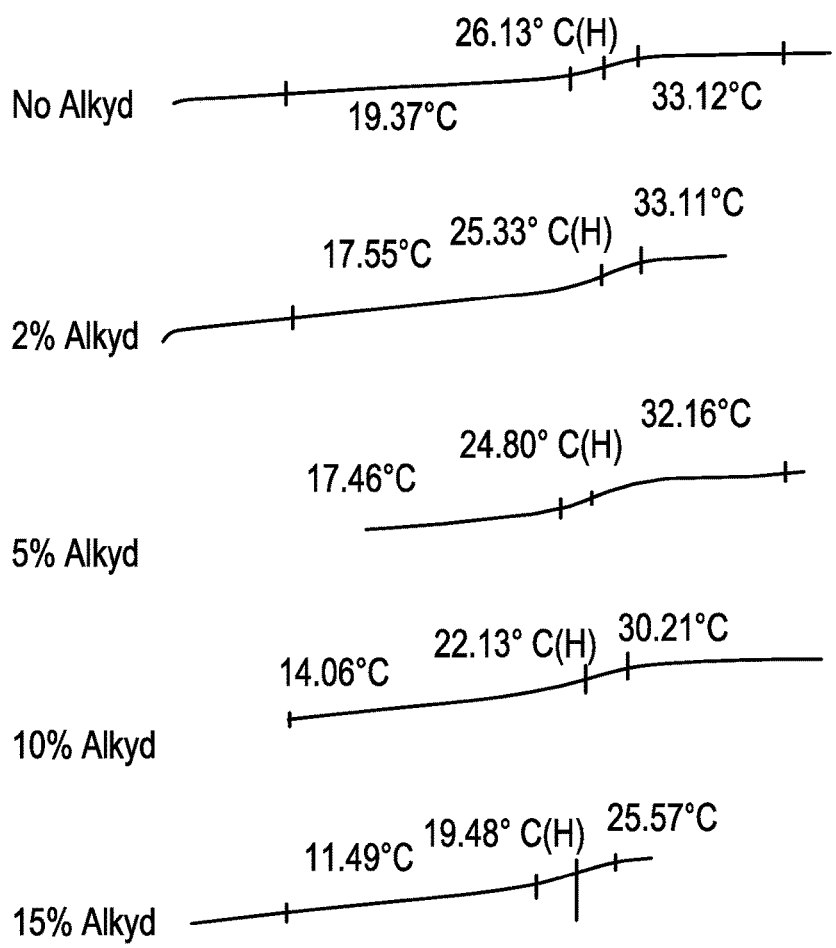
FIG. 3 is a plot of DSC scans for films made with the various latexes prepared using 0 to 15% acrylic modified alkyd polymer in Example 4.

Glass transition temperature was measured using differential scanning calorimetry (DSC). FIG. 3 shows DSC scans for film made with the various latexes prepared using 0 to 15% acrylic modified alkyd polymer. As can be seen in FIG. 3, the glass transition temperature decreases with increasing concentration of acrylic modified alkyd polymer.

Figure 4:
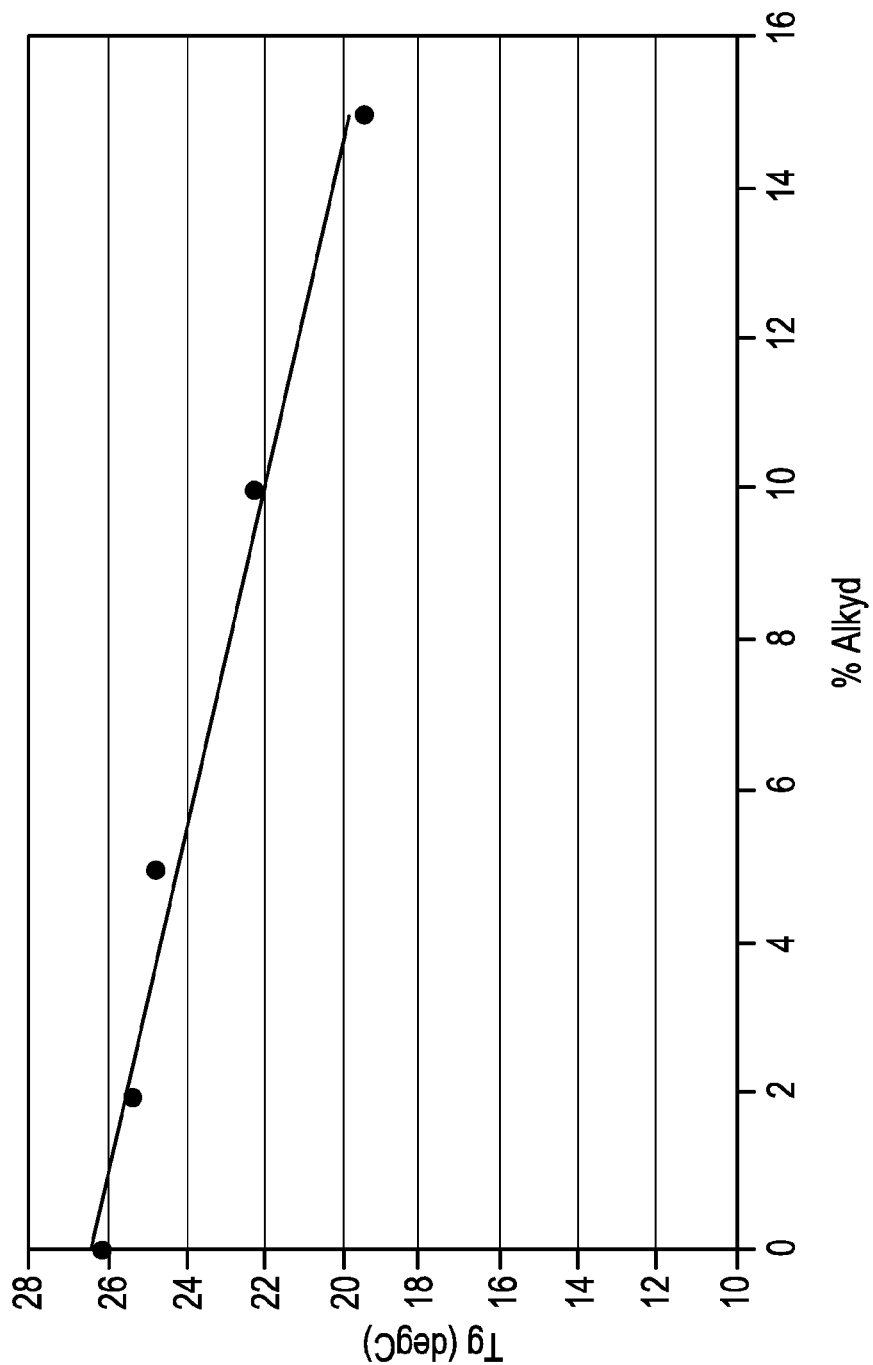
FIG. 4 is a plot of measured glass transition temperatures for films prepared with varying amounts of acrylic modified alkyd polymer versus concentration of alkyd polymer in Example 4.

FIG. 4 is a plot of measured glass transition temperature for films prepared with varying amounts of acrylic modified alkyd polymer versus concentration of alkyd polymer. As can be seen in FIG. 4, the glass transition temperature is continuously lowered with increasing concentration of acrylic modified alkyd polymer. The decrease in glass transition temperature with increased concentration of alkyd polymer confirms that acrylic modified alkyd polymers have good phase mixing with acrylic-based polymers and can function as effective plasticizers to lower the glass transition temperature of the resulting latexes.

If there were not sufficient phase mixing between the acrylic modified alkyd polymer and the acrylic-based polymer, the glass transition temperature would not be linearly affected by the addition of alkyd polymer.

Example 5

White paints were prepared using the latexes prepared in Example 3 using 0 to 15% acrylic modified alkyd polymer as a co-surfactant. The below formulation was used to produce the paint.

| Ingredients | Pounds | Gallons |
|---|---|---|
| Water | 175.0 | 21.0 |
| BYK 024 | 2.0 | 0.3 |
| Tamol 1124 | 4.5 | 0.5 |
| Carbowet DC-01 | 2.0 | 0.2 |
| Coaour 830W | 5.0 | 0.6 |
| Ti-Pure" R-706 | 235.0 | 5.9 |
| Disperse using a high speed disperser with Hegman 6+ at 2000 rpm for 15 mins. Then letdown as follows: | | |
| Butyl CARBITOL Solvent | 12.0 | 1.5 |
| Texanol | 10.0 | 1.3 |
| Coapur 830W | 5.0 | 0.6 |
| Acticide MBS | 2.5 | 0.3 |
| BYK 024 | 2.5 | 0.4 |
| Latex | 507.0 | 57.0 |
| Water | 95.0 | 11.4 |
| Total | 1057.5 | 100.8 |
| Paint Properties | | |
| Wt. Solids: | 46.2% | |

| Ingredients | Pounds | Gallons |
|---|---|---|
| Vol. Solids: | 32.2% | |
| PVC: | 18.3% | |
| P/B Wt | 0.93 | |
| P/B Vol | 0.22 | |
| VOC (g/l) | 77.2 | |

Figure 5:
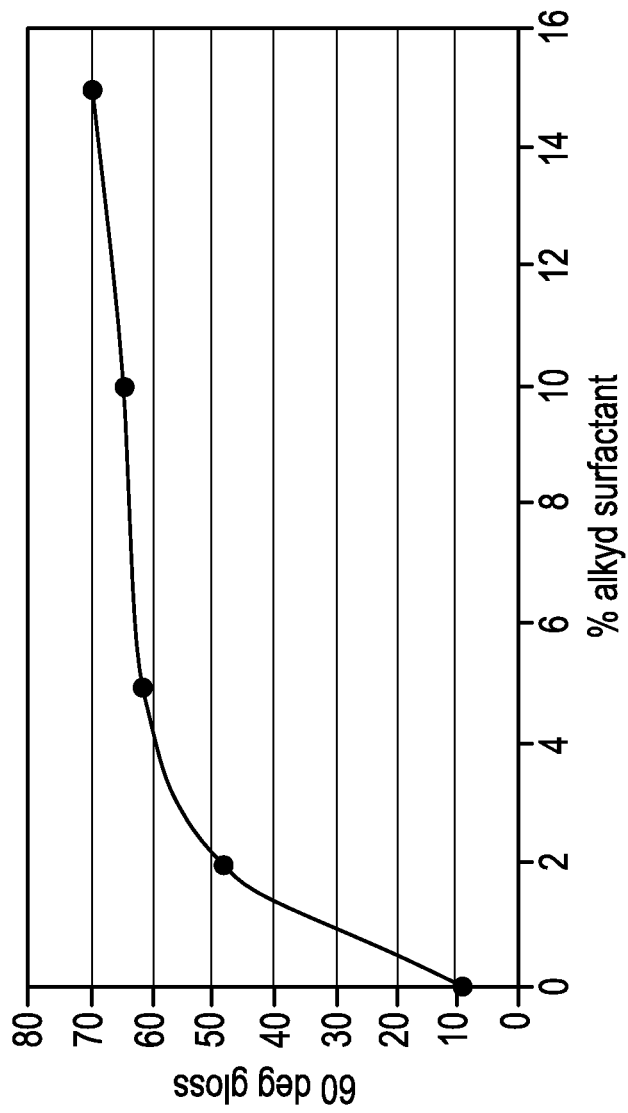
FIG. 5 is a plot of the gloss of the resulting paints in Example 5 as a function of the amount of alkyd polymer used to prepare the latex used in the paints.

Analysis was performed to determine the gloss of the exemplary paints produced. Gloss properties were evaluated using ASTM method D 523. This method measures the specular gloss of a coating surface at a fixed geometry such as 20°, 60° or 85°. FIG. 5 is a plot of the gloss of the resulting paints as a function of the amount of alkyd polymer used to prepare the latex. As can be seen in FIG. 5, the gloss of the resulting white paint increases with increasing concentration of alkyd polymer. Further, a concentration of as little as 2% acrylic modified alkyd polymer improves the gloss of the resulting white paint.

The adhesion properties of the resulting white paints were also analyzed. In order to analyze the adhesion properties of the white paints, ASTM D 3359-08 analysis showed that using an acrylic modified alkyd polymer to produce latex via emulsion polymerization provides improved adhesion properties for paints produced using the resulting latex. That is, paints having concentrations as low as 2% acrylic modified alkyd polymer showed improved adhesion to steel in comparison to paint prepared with latexes that have no acrylic modified alkyd polymer. These results can be seen in FIGS. 6 and 7.

Figure 6:
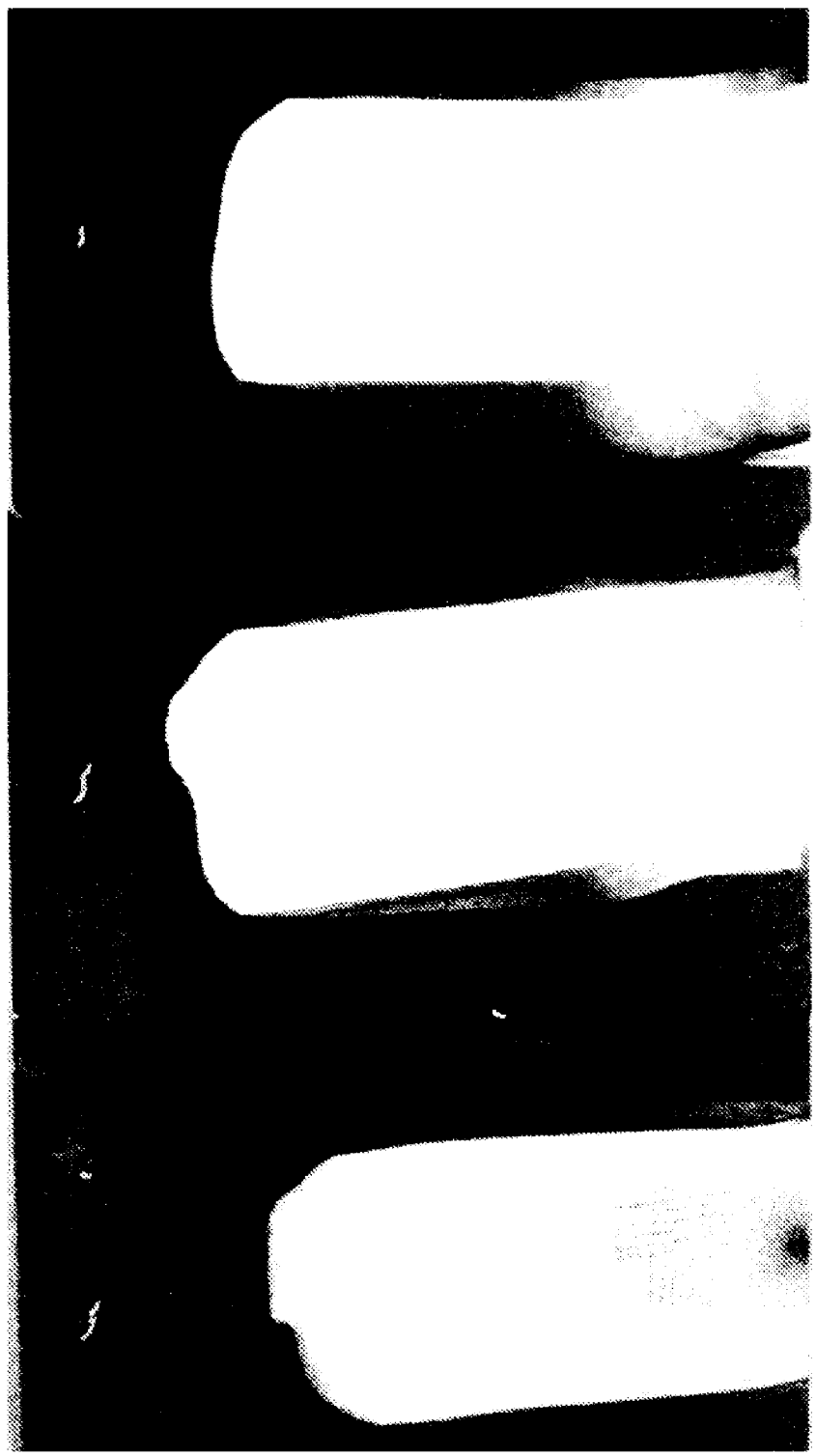
FIG. 6 is a picture of three steel substrates coated with white paint having varying concentrations of acrylic modified alkyd polymer for adhesion analysis in Example 5.

FIGS. 6 and 7 demonstrate that the improved film formation properties provided by a flexible alkyd polymer also improve adhesion to a steel substrate. FIG. 6 is a picture of three substrates that had been coated with white paint having varying concentrations of acrylic modified alkyd polymer for adhesion analysis. In the picture, the substrates were coated with paint as follows: 0% (left), 2% (middle), and 5% (right) alkyd polymer, respectively.

FIG. 7 is a plot of adhesion to steel of white paint versus concentration of alkyd polymer used in preparing latex used in preparing paint being analyzed. As can be seen in FIGS. 6 and 7, incorporating an acrylic based alkyd polymer for emulsion polymerization improves the film formation properties of the latexes formed thereby and also improves gloss and adhesion to steel of paint products produced using such latexes.

We claim:

1. A latex particle comprising a core and a shell surrounding said core, wherein the core comprises an acrylic and/or vinyl polymer and the shell comprises water soluble acrylic modified alkyd polymer and at least one surfactant which is an emulsifier, wherein substantially all of the acrylic modified alkyd polymer and said at least one surfactant is present in the shell of the latex particle, and substantially none of the acrylic modified alkyd polymer is present in the core.

2. The latex particle of claim 1, wherein the acrylic and/or vinyl polymer in the core is selected from the group consisting of one or more of an alkyl (meth) acrylate monomer, vinyl monomer, styrene, alkyl substituted styrene, a mono ethylenically unsaturated carboxylic acid monomer, a phosphorous containing monomer, or a sulfur containing monomer.

3. The latex particle of claim 1, wherein the alkyd polymer is introduced into the outer shell of the latex particle by maintaining a presence of the alkyd polymer during polymerization of a monomer precursor of the core polymer.

4. The latex particle of claim 1, which is film-forming.

5. The latex particle of claim 1, wherein the alkyd polymer has been neutralized by a basic compound.

6. The latex particle of claim 5, wherein the basic compound is selected from the group consisting of ammonium hydroxide, triethyl amine, n-methyl morpholine, n,n-dimethyl ethanol amine, lithium hydroxide, sodium hydroxide, and potassium hydroxide.

7. The latex particle of claim 1, wherein the particle size ranges from about 5 um to about 700 nm.

8. The latex particle of claim 1, wherein the pH of the particle ranges from about 5 to about 9.

9. The latex particle of claim 1, wherein the glass transition temperature (Tg) of the particle ranges from about −70° C. to about 100° C.

10. A process for forming the latex particle of claim 1, which is film-forming, comprising polymerizing a monomer precursor of the core polymer in the presence of the water soluble alkyd polymer and the at least one surfactant.

11. The process of claim 10, wherein the alkyd polymer is introduced to a polymerization reactor as an initial charge prior to polymerization.

12. The process of claim 11, wherein the alkyd polymer is introduced to the polymerization reactor during polymerization.

13. The process of claim 10, wherein the alkyd polymer is introduced to a polymerization reactor in combination with a monomer precursor of the core polymer and at least one surfactant.

14. A coating composition comprising the latex particle of claim 1.

15. The coating composition of claim 14, wherein the coating composition comprises less than 10% solvent.

16. The coating composition of claim 15, wherein the composition is substantially solvent free.

17. The coating composition of claim 14, wherein the alkyd polymer comprises from about 0.5% to about 25% of the coating composition, by weight.

18. A film comprising the latex particles of claim 1 which are coalesced wherein the film has a film formation temperature of about −70° C. to about 100° C.

19. The film of claim 18, wherein the film has a glass transition temperature (Tg) of about −30° C. to about 100° C.

20. A latex particle which is film forming in a water based latex, said latex particle comprising a core and a shell surrounding said core, wherein the latex particle comprises an acrylic and/or vinyl polymer, a water soluble acrylic modified alkyd polymer, and at least one emulsifier surfactant, wherein the acrylic and/or vinyl polymer is present in the core and substantially none of the acrylic modified alkyd polymer is present in the core, and wherein substantially all of the acrylic modified alkyd polymer and the at one surfactant is present in the shell.

* * * * *